United States Patent [19]

Yamada

[11] Patent Number: 4,533,825
[45] Date of Patent: Aug. 6, 1985

[54] BAR CODE RECOGNITION APPARATUS

[75] Inventor: Shigeru Yamada, Tokyo, Japan

[73] Assignee: Casio Computer Co., Ltd., Tokyo, Japan

[21] Appl. No.: 504,483

[22] Filed: Jun. 15, 1983

[30] Foreign Application Priority Data

Jun. 23, 1982 [JP] Japan ................. 57-108137

[51] Int. Cl.³ .............................................. G06K 7/10
[52] U.S. Cl. ....................................... 235/463; 382/12
[58] Field of Search .......................... 382/12; 235/463

[56] References Cited

U.S. PATENT DOCUMENTS 3,988,573 10/1976 Hayosh et al. .
4,354,101 10/1982 Hester et al. ..................... 235/463
4,379,224 4/1983 Engstrom ......................... 235/463

Primary Examiner—David L. Trafton
Attorney, Agent, or Firm—Frishauf, Holtz, Goodman & Woodward

[57] ABSTRACT

A bar code recognition apparatus comprises a manual scanner for reading each code bar, a comparison circuit for comparing a width value detection signal to a reference value to produce a width value amplitude comparison signal, a ratio circuit for making a ratio between one and another of said width value detection signals to produce a ratio signal, and a character decoder for decoding the comparison signal and the ratio signal. Accordingly, one character output is provided corresponding to the width value detection signal of a detected code bar.

6 Claims, 7 Drawing Figures

FIG. 2
PRIOR ART

| DECIMAL NUMBERS | LEFT BAR CHARACTERS | | RIGHT BAR CHARACTERS |
|---|---|---|---|
| | ODD PARITY | EVEN PARITY | |
| 0 | 0001101 | 0100111 | 1110010 |
| 1 | 0011001 | 0110011 | 1100110 |
| 2 | 0010011 | 0011011 | 1101100 |
| 3 | 0111101 | 0100001 | 1000010 |
| 4 | 0100011 | 0011101 | 1011100 |
| 5 | 0110001 | 0111001 | 1001110 |
| 6 | 0101111 | 0000101 | 1010000 |
| 7 | 0111011 | 0010001 | 1000100 |
| 8 | 0110111 | 0001001 | 1001000 |
| 9 | 0001011 | 0010111 | 1110100 |

FIG. 5

| | |
|---|---|
| $A > C_H$ | d1 |
| $C_H > A > C_L$ | d2 |
| $C_L > A$ | d3 |
| $B > D_H$ | d4 |
| $D_H > B > D_L$ | d5 |
| $D_L > B$ | d6 |

FIG. 6

| | |
|---|---|
| d1 d4 | S1 |
| d1 d5 | S2 |
| d1 d6 | S3 |
| d2 d4 | S4 |
| d2 d5 | S5 |
| d2 d6 | S6 |
| d3 d4 | S7 |
| d3 d5 | S8 |
| d3 d6 | S9 |

FIG. 7

| OUTPUT SIGNAL FROM A/D CONVERTER | OUTPUT FROM DECODER 25 | OUTPUTS FROM RATIO CALCULATING CIRCUITS 27d to 27e | | | | | OUTPUT FROM DECODER 26 |
|---|---|---|---|---|---|---|---|
| | | A:B | C:D | A+B : C+D | A+C : B+D | A+D : B+C | |
| ⎍ | S8 | 1:1 | 3:2 | 2:5 | 4:3 | 3:4 | 4 REPRESENTED BY ODD PARITY |
| ⎍ | S8 | 1:2 | 3:1 | 3:4 | 4:3 | 2:5 | 5 REPRESENTED BY ODD PARITY |
| ⎍ | S8 | 1:1 | 3:1 | 4:1 | 5:2 | 2:5 | 3 REPRESENTED BY EVEN PARITY |
| ⎍ | S8 | 1:2 | 1:1 | 1:1 | 3:4 | 3:4 | 1 REPRESENTED BY EVEN PARITY |
| ⎍ | S8 | 2:1 | 2:1 | 3:1 | 5:2 | 3:4 | 7 REPRESENTED BY EVEN PARITY |

BAR CODE RECOGNITION APPARATUS

BACKGROUND OF THE INVENTION

This invention relates to an improvement of a bar code recognition apparatus.

Bar codes in common use nowadays are based on the JAN (Japan Article Number) as depicted in FIG. 1. Each of these bar codes consists of a first group 1 of characters, a second group 2 of characters, center bars 3, left bars 4, and right bars 6. The first group 1 consists of six characters, and the second group 2 consists of five characters and one digit modulus check character 8. The center bars 3 are positioned between the first group 1 and second group 2. The left bars 4 are on the left side of the first group 1, and the right bars 6 are on the right side of the second group 2. Each bar code is separated from the preceding bar code by a left margin 5 and from the following bar code by a right margin 7.

The six characters of the first group 1 represent numerals 0 to 5, respectively. The five characters of the second group 2 represent numerals 6, 7, 8, 9 and 0, respectively. Each of these eleven characters is comprised of two white bars and two black bars, which are alternately arranged.

FIG. 2 shows a concordance between numerals 0 to 9 and the eleven characters of the bar code shown in FIG. 1. Each character is expressed by seven bits. Any bit "0" corresponds to a white bar, and any bit "1" corresponds to a black bar. Any consecutive bits "0" are represented by a thicker white bar, and any consecutive bits "1" are represented by a thicker black bar. In other words, the wider each bar, the more bits. Each character of the first group 1 is represented by two kinds of data, using both odd and even parities, whereas each character of the second group 2 is expressed only by data of even parity. Since data of odd and even parities are used to express the six characters of the first group 1, the number of possible decimal modes of expression is increased and the applicable fields for the characters is broadened.

The bar codes as explained above have been widely used in POS (Point of Sales) systems. Once prices of commodities expressed in bar codes are read, the totals of prices of commodities sold can be calculated rapidly and efficiently. To read such bar codes, a fixed scanner 10 shown in FIG. 3 and disclosed in U.S. Pat. No. 3,988,573, or a manual scanner such as a light pen has been used. The manual scanner is subject to variations related to the speed of scanning a bar code so that a pattern electrically formed as the result of reading a bar code may often change the width of the bars, which causes misrecognition of the bar code. Particularly, if bar codes such as JAN, which have four kinds of bar widths (or control width, double, triple and guadruple width), are to be recognized, it is not possible to determine whether a width value which is generated in a reader is correct or is a changed value. Thus, a correct recognition of bar codes cannot be achieved.

SUMMARY OF THE INVENTION

Accordingly, the object of the invention is to provide a bar code recognition apparatus capable of a correct reading operation within a varied scanning speed, and thus capable of enhancing reliability and operability for recognition of bar codes.

According to the invention, a bar code recognition apparatus to achieve the above-mentioned object comprises means for reading a width value of each of four bars of two kinds presented alternately on a medium, to represent one character, means connected to said reading means for storing said width values of said four bars for one read character, calculation means for calculating and producing two width values respectively smaller and greater than that of one of the two bars of a first kind and two width values respectively smaller and greater than that of one the two bars of a second kind; comparison means connected to said memory means and said calculation means for comparing said smaller and greater width values of the bar of the first kind with the width value of the other bar of the first kind, and for comparing the smaller and greater width values of the bar of the second kind with the width value of the other bar of the second kind, and for generating, according to the result of the comparison, a first, a second, or a third width value amplitude comparison signal for the respective different kinds of bars, said first width value amplitude comparison signal being generated when said width value signal for a read individual bar is a width value signal indicative of a still greater width than said greater width provided by said calculation means, said second width value amplitude comparison signal being generated when said width value signal for a read individual bar is a width value signal indicative of a still smaller width than said smaller width provided by said calculation means, said third width value amplitude comparison signal being generated when said width value signal for a read individual bar is a width value signal indicative of a width intermediate between said greater and said smaller widths provided by said calculation means, decoding means connected to said comparison means for combining said width value amplitude comparison signals successively produced from said comparison means to produce nine combination signals of said width value amplitude comparison signals, ratio calculation means connected to said memory means for calculating a ratio value from the width values of said read individual bars read out from said memory means, and means connected to said decoding means and said ratio calculating means for determining a corresponding character on a basis of one of said combination signals of said width value amplitude comparison signals derived from said decoding means and said ratio value of various width values calculated by said ratio calculation means.

It is to be understood that a bar code recognition apparatus according to the invention generates a width value amplitude comparison signal based on a width value detected in a bar code, and a signal indicative of a ratio of the width values, and identifies one character by said two signals, so that misrecognition can thereby be corrected if it occurs due to any variation in the scanning speed of the bar code recognition apparatus, which results in enhancement of reliability of operation and operability.

BRIEF DESCRIPTION OF THE DRAWINGS

FIG. 2 shows a concordance of character codes to the decimal numbers in accordance with JAN;

FIG. 5 shows a relationship between comparisons made and signals generated by the comparison circuit of FIG. 4;

FIG. 6 shows nine combination signals generated by the width decoder of FIG. 4 from the width amplitude comparison signals; and FIG. 7 shows a decoding relationship between the output and input of a character decoder in FIG. 4.

DETAILED DESCRIPTION OF THE PREFERED EMBODIMENTS

One preferred embodiment will be described by reference to FIGS. 4 to 7.

Figure 1:
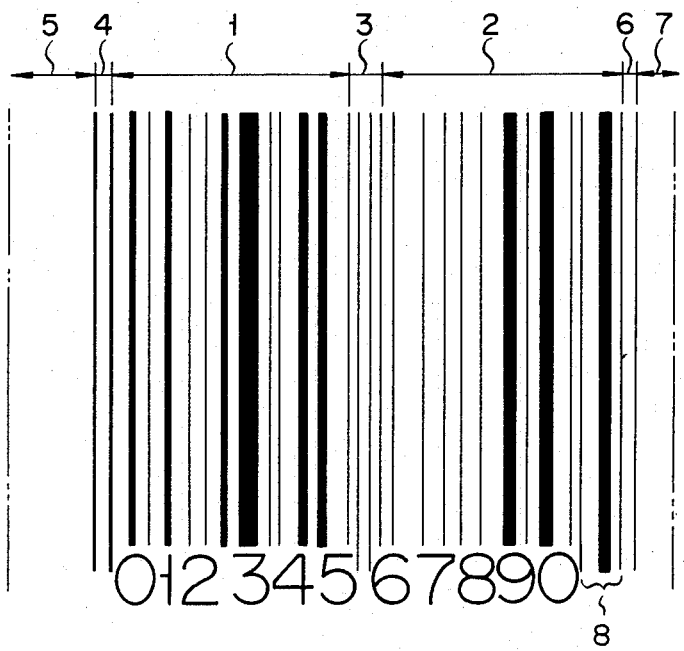
FIG. 1 shows a sample bar code based on JAN.
Figure 3:
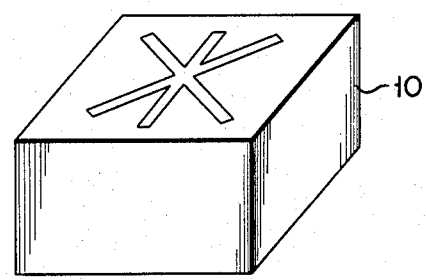
FIG. 3 shows a known type of fixed scanner.
Figure 4:
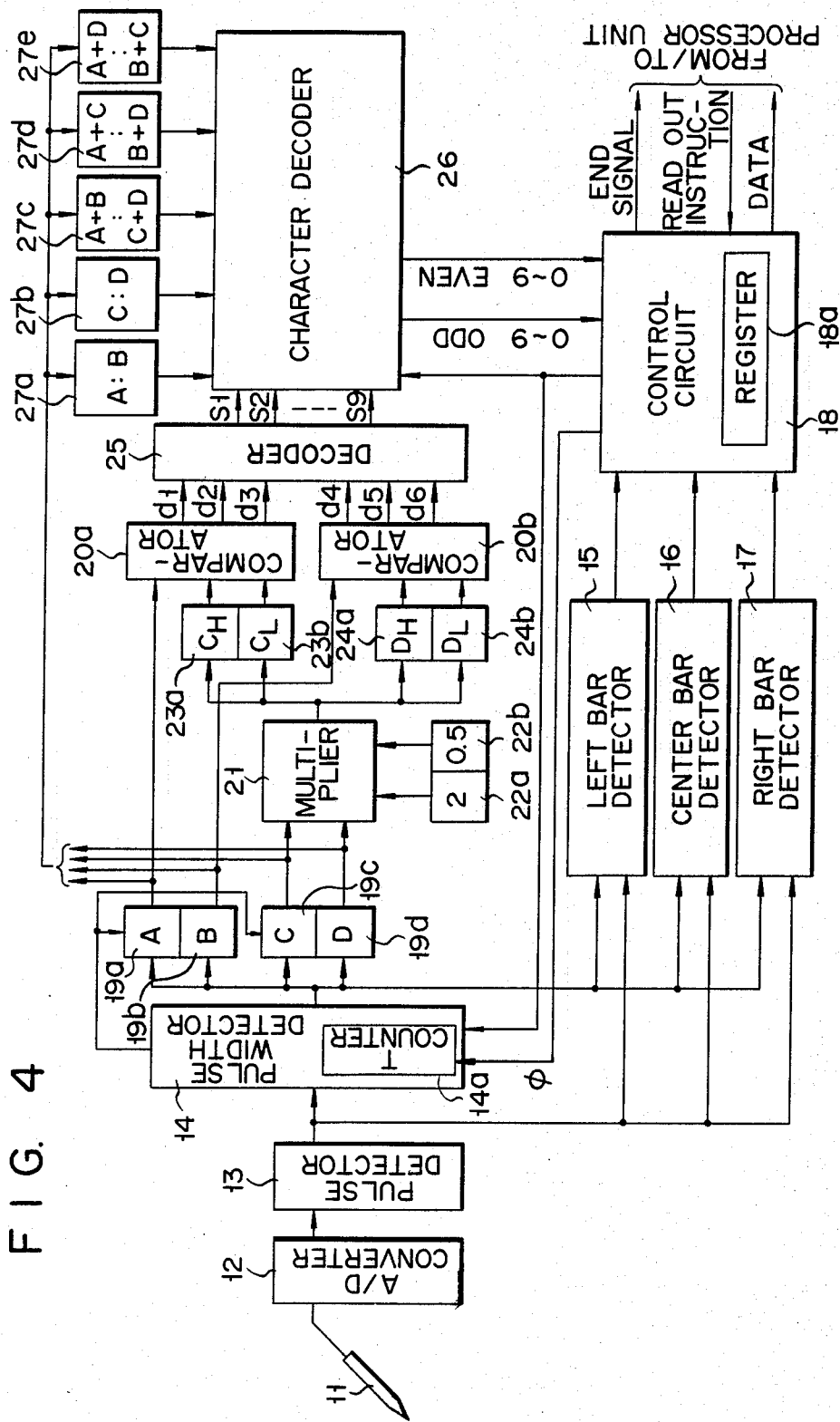
FIG. 4 shows a block circuit diagram of a bar code recognition apparatus according to the invention.

A bar code recognition apparatus according to the invention may have a manual scanner pen 11 with a photoelectric transducer, as shown in FIG. 4, for reading a bar code recorded on, for example, a price tag or the like. Bar code information read through the pen 11 is analog-to-digital (A/D) converted by an A/D convertor 12, and supplied to a pulse detection circuit 13 which supplies outputs to a pulse width detection circuit 14, as well as to a left bar detection circuit 15, center bar detection circuit 16 and right bar detection circuit 17. The pulse detection circuit 14 includes an internal counter 14a for counting clock pulses $\phi$ from a control circuit 18 to provide a count number as an input pulse width to the pulse detection circuit 14. Pulse width data held in the counter 14a are supplied not only to the left bar detection circuit 15, center bar detection circuit 16, and right bar detection circuit 17, but, under commands from the control circuit 18, are also supplied to A to D registers 19a to 19d. Various detection circuits 15 to 17 supply outputs to the control circuit 18. The pulse width detection circuit 14 supplies an address signal for designating registers 19a to 19d. Data held in A and B registers 19a and 19b are inputted to comparison circuits 20a and 20b, and data in C and D registers 19c and 19d, to a multiplication circuit 21 which is applied with multiplication data, "2" and "0.5" from multiplication data retention circuits 22a and 22b. Data multiplied two or 0.5 times are inputted to registers 23a and 23b, and 24a and 24b. Specifically, the product of 2 times the data held in the C register 19c is written in register 23b, and 0.5 times the same is written in register 24b. Data held in registers 23a and 23b are inputted to comparison circuit 20a, and those in registers 24a and 24b are inputted to comparison circuit 20b.

The comparison circuit 20a compares the contents of A register 19a to those contents $C_H$, and $C_L$ of registers 23a and 23b and generates, as shown in FIG. 5, a signal $d_1$ when A is greater than $C_H (A>C_H)$; a signal $d_2$ when A is smaller than $C_H$ and greater than $C_L (C_H>A>C_L)$; and a signal $d_3$ when A is smaller than $C_L (C_L>A)$, all for white bars. Comparison circuit 20b compares the contents of B register 19b to those contents $D_H$ and $D_L$ of registers 24a and 24b and generates, as shown in FIG. 5, a signal $d_4$ when B is greater than $D_H (B>D_H)$; signal $d_5$ when B is smaller than $D_H$ and greater than $D_L$ $(D_H>B>D_L)$; and signal $d_6$ when B is smaller than $D_L$ $(D_L>B)$. Width decoder 25 receives the comparison signals $d_1$ to $d_3$ and $d_4$ to $d_6$, and generates nine combination signals $S_1$ to $S_9$ of said width amplitude comparison signals, as shown in FIG. 6, by a combination of the received signals $d_1$ to $d_3$, and $d_4$ to $d_6$. Combination signals $S_1$ to $S_9$ are applied to a character decoder 26. Data held in the above-mentioned A to D registers 19a to 19d is applied to ratio circuits 27a to 27e which make calculations with ratios of A:B, C:D, A+B:C+D, A+C:B+D, and A+D:B+C. The results of the calculations by the ratio circuits are inputted to the character decoder 26. The character decoder 26 determines numerals "0" to "9" in odd and even parities from the signals $S_1$ to $S_9$ from the width decoder 25 and ratio signals from ratio circuits 27a to 27e. The control circuit 18 commands the character decoder 26 to output the corresponding value data.

FIG. 7 shows a decoding example of ratio outputs of ratio circuits 27a to 27d when a combination signal S8 of amplitude comparison signals of the width signals is outputted from the width decoder 25. The control circuit 18 receives outputs from the character decoder 26. A register 18a is provided in the control circuit 18 which operates to successively store value data generated by character decoder 26 one character at a time, and to output an END signal to an operation processor unit (not shown) when a detection signal is inputted from the right bar detection circuit 17 after characters on one label have each been read. When the operation processor unit receives the END signal from the control circuit 18 it reads commands to the control circuit 18 so that value data held in register 18a are read out for further operation.

The operation of the embodiment will now be described. The pen 11 is operated to scan a bar code recorded on the surface of a commodity or its tag and produces an electric signal output indicative of widths of bars in the code. The output of the pen 11, after being analog-to-digital converted, is supplied to the pulse detection circuit 13 which detects a leading and a trailing edge of the bar-indicative pulse signal and produces a sharp pulse signal in response to such detection. The sharp pulse signal is inputted to the pulse width detection circuit 14 and to the left bar detection circuit 15, center bar detection circuit 16 and right bar detection circuit 17. The pulse width detection circuit 14 constantly counts clock pulses $\phi$ from control circuit 18 by means of its internal counter 14a. Every time the pulse signals arrive from the pulse detection circuit 13, contents of counter 14a are inputted to the respective bar detection circuits 15 to 17 and counter 14a is cleared to start a new counting operation. Thus, when the left bar detection circuit 15 detects a left bar and the control circuit 18 receives such a detection signal, the control circuit commands the pulse width detection circuit 14 to send its output to A to D registers 19a to 19d. After being provided with the output command, pulse width detection circuit 14 successively addresses A to D registers 19a to 19d and allows the count value of counter 14a to be successively written in A to D registers 19a to 19d upon the arrival of each pulse signal from pulse detection circuit 13. Thus, width data of two black and two white code bars (four in all) are written in A to D registers 19a to 19b. In this embodiment, detection data of white bars are written in A and C registers 19a and 19c, while those of black bars are written in B and D registers 19b and 19d.

Data held in C register 19c is fed to multiplication circuit 21 in which the same is multiplied by 2 and 0.5 times separately. The two times multiplication data is written in register 23a while the 0.5 times data is written in register 23b. Data held in the D register 19d are similarly multiplied, and two times and 0.5 times data are written in registers 24a and 24b, respectively. Data in registers 23a and 23b are fed to comparison circuit 20a and therein compared to the contents of A register 19a which holds data about the same kind (black or white)

of code bar. Data in registers 24a and 24b are fed to comparison circuit 20b and therein compared to the contents of B register 19b which holds data about the other kind (white or black) of code bar. Comparison circuits 20a and 20b make determinations about code bars of the same kinds as shown in FIG. 5, and produce signals $d_1$ to $d_3$, and $d_4$ to $d_6$ indicating the results of each determination. The determination signals are fed to the width decoder 25 which produces nine width signal amplitude comparison signals $S_1$ to $S_9$ in response to combinations of these determination signals $d_1$ to $d_3$, and $d_4$ to $d_6$ from comparison circuits 20a and 20b, respectively, as shown in FIG. 6. The amplitude comparison signals are fed to the character decoder 26.

Data held in A to D registers 19a to 19d are, on the other hand, fed to ratio circuits 27a to 27e, which calculate A:B, C:D and other ratios between combinations, which are all then fed to the character decoder 26. The character decoder 26 determines decimals 0 to 9 in odd and even parities, as shown in FIG. 7, from the signals $S_1$ to $S_9$ from the width decoder 25 and outputs from ratio circuits 27a to 27e. The output of the character decoder is fed to control circuit 18. Specifically, the character decoder 26 decodes odd or even parity numbers for the left side character data of the center bar in FIG. 2 and exclusively odd parity numbers for right side character data thereof. The right side characters formed exclusively in even parity have the same parity codes as the odd parity codes for the left side characters, but with "0" and "1" inverted, so that in this embodiment, the character decoder decodes only odd parity codes for the right side characters. After the detection signal from the center bar detection circuit 16 is received by control circuit 18, the latter treats odd parity characters from character decoder 26 as the right side characters. The control circuit 18 writes data from character decoder 26 in internal register 18a. When the right bar detection circuit 17 outputs a detection signal, the control circuit 18 outputs an END signal to its processor unit. When a read-out command from the processor unit is received by control circuit 18, the latter allows bar code recognition data to te supplied to the processor unit.

The foregoing embodiment is directed to JAN codes, but it is obvious that the invention may be applied for any other types of codes, such as the Universal Product Code (UPC) or European Article Number (EAN).

It is also obvious that a manual scanner pen can scan from left to right although the foregoing embodiment shows the pen scanning from right to left.

Further, the invention may be applied to apparatuses having fixed scanners, not only to those with manual scanners as in these embodiments, although precision is rather low in recognition apparatuses using fixed scanners.

Moreover, the invention is not restricted to an optical type scanner, as in the foregoing embodiment, but may use a magnetic system for reading out bar codes.

What is claimed is:

1. A bar code recognition apparatus, comprising:
   means for reading a width value of each of four bars of two kinds presented alternately on a medium, to represent one character;
   memory means connected to said reading means for storing said width values of said four bars for each character read by said reading means;
   calculation means for calculating and producing two width values respectively smaller and greater than that of one of the two bars of a first kind, and two width values respectively smaller and greater than that of one of the two bars of a second kind;
   first comparison means, connected to said memory means and said calculation means, for comparing said smaller and greater width values of the bar of the first kind with the width value of the other bar of the first kind and for generating, according to the result of the comparison, a first, a second, or a third width value amplitude comparison signal for the first kind of bars, said first width value amplitude comparison signal being generated when said width value signal for a read individual bar is a width value signal indicative of a still greater width than said greater width provided by said calculation means, said second width value amplitude comparison signal being generated when said width value signal for a read individual bar is a width value signal indicative of a still smaller width than said smaller width provided by said calculation means, said third width value amplitude comparison signal being generated when said width value signal for a read individual bar is a width value signal indicative of a width intermediate between said greater and said smaller widths provided by said calculation means;
   second comparison means, connected to said memory means and said calculation means, for comparing the smaller and greater width values of the bar of the second kind with the width value of the other bar of the second kind, and for generating, according to the result of the comparison, the first, the second, or the third width value amplitude comparison signals for the second kind of bars;
   decoding means connected to said first and said second comparison means for combining said width value amplitude comparison signals produced from said first comparison means with said width value amplitude comparison signals produced from said second comparison means to produce nine combination signals of said width value amplitude comparison signals;
   ratio calculation means connected to said memory ans for calculating a ratio value from the width values of said read individual bars read out from said memory means; and
   means, connected to said decoding means and said ratio calculation means, for determining a corresponding character on a basis of one of said combination signals of said width value amplitude comparison signals derived from said decoding means and said ratio value of various width values calculated by said ratio calculation means.

2. The bar code recognition apparatus according to claim 1 wherein said calculation means includes means for multiplying said bar width values of bars of two kinds by a predetermined constant or its inverse.

3. The bar code recognition apparatus according to claim 1 wherein said ratio calculation means are means for calculating a ratio between sums of two and another two of the four bar width values.

4. The bar code recognition apparatus according to claim 1 further including means connected to said character determining means for successively storing therein determined characters and detecting completion of a reading operation of a bar code for one label medium.

5. The bar code recognition apparatus according to claim 1 wherein said reading means is a manual scanner.

6. The bar code recognition apparatus according to claim 1 wherein said reading means is a fixed scanner.

* * * * *

UNITED STATES PATENT AND TRADEMARK OFFICE
CERTIFICATE OF CORRECTION

PATENT NO. : 4,533,825
DATED : August 6, 1985
INVENTOR(S) : Shigeru YAMADA

It is certified that error appears in the above-identified patent and that said Letters Patent is hereby corrected as shown below:

Column 6, line 41 "ans" should read --means--.

Signed and Sealed this

Twenty-second Day of April 1986

[SEAL]

Attest:

DONALD J. QUIGG

Attesting Officer     Commissioner of Patents and Trademarks